(12) United States Patent
Nilsson

(10) Patent No.: US 6,289,446 B1
(45) Date of Patent: Sep. 11, 2001

(54) EXCEPTION HANDLING UTILIZING CALL INSTRUCTION WITH CONTEXT INFORMATION

(75) Inventor: Hans-Peter Nilsson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/163,123

(22) Filed: Sep. 29, 1998

(51) Int. Cl.[7] .................................................. G06F 9/40
(52) U.S. Cl. .................................. 712/244; 712/242
(58) Field of Search .................................. 712/244, 229, 712/242; 710/260–269; 709/108

(56) References Cited

U.S. PATENT DOCUMENTS

| | | | | |
|---|---|---|---|---|
| 5,628,016 | * | 5/1997 | Kukol ..................................... | 395/704 |
| 5,925,123 | * | 6/1999 | Tremblay et al. ..................... | 712/212 |
| 5,996,058 | * | 11/1999 | Song et al. ............................. | 712/31 |
| 6,003,038 | * | 12/1999 | Chen ..................................... | 707/103 |
| 6,009,515 | * | 12/1999 | Steele, Jr. ............................. | 712/244 |
| 6,021,469 | * | 2/2000 | Tremblay et al. .................... | 711/125 |

OTHER PUBLICATIONS

Chase, David, "Implementations of exception handling, Part I", Jun. 1994, pp. 229–240.*
Chase, David, "implementations of exception handling, Part II: Calling conventions, asynchrony, optimizers, and debuggers", Sep. 1994, pp. 20–30 .*

* cited by examiner

*Primary Examiner*—John F. Niebling
*Assistant Examiner*—Stacy Whitmore
(74) *Attorney, Agent, or Firm*—Cary & Kelly, LLP; Charles C. Cary

(57) ABSTRACT

In-code context data used for exception handling is incorporated into a special call instruction which is recognized by the processor. The information is skipped at the time of the function call and read at the time of the stack unwinding. This special call instruction may be implemented to run at no extra cycle costs compared to normal instructions, except for the external execution time dependencies from such machinery as a cache involved in the instruction fetching, since it would never be necessary during normal execution to actually access the information. The information is only accessed during exception handling.

19 Claims, 7 Drawing Sheets

| Assembly code: | JSR | A_function |
|---|---|---|
| Binary value: | 00111111 10111101 | 10000010 11110011 01011110 00010011 |
| Assembly code: | JSRC | A_function, This_context_table |
| Binary value: | 00111111 00111101 | 10000010 11110011 01011110 00010011 11001100 10101010 01110111 01010101 |
| Assembly code: | JSR | R5 |
| Binary value: | 10110101 10111001 | |
| Assembly code: | JSRC | R5, This_context_table |
| Binary value: | 10110101 00111001 | 11001100 10101010 01110111 01010101 |

| | Cycle 1 up-to n1 | Cycle n1 up-to n2 | Cycle n2 up-to n3 | Cycle n3 up-to n4 |
|---|---|---|---|---|
| JSR | Read the instruction. Decode the instruction. Update PC to the location after the instruction. | Read the operands. Update PC to the location after the operands. | Store PC at the location of the return address. Update any related entities (such as the stack pointer). | Read the next instruction. (At the target of the call). ... |
| JSRC | Read the instruction. Decode the instruction. Update PC to the location after the instruction. | Read the operands. Update PC to the location after the operands plus the fixed size of the code-word. | Store PC at the location of the return address. Update any related entities (such as the stack pointer). | Read the next instruction. (At the target of the call). ... |

FIG. 6

EXCEPTION HANDLING UTILIZING CALL INSTRUCTION WITH CONTEXT INFORMATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Field of the Invention

The present invention relates generally to systems and methods for increasing the reliability and improving the behavior of software programs. More particularly, the present invention relates to exception-handling systems and methods which assist software developers in the task of ensuring that programs operative on digital computers can recover from exceptional conditions and runtime program errors.

Before a digital computer may accomplish a desired task, it must receive an appropriate set of instructions. Executed by the computer's microprocessor, these instructions, collectively referred to as a "computer program," direct the operation of the computer.

Computers essentially only understand "machine code," that is, the low-level instructions for performing specific tasks interpreted as specific instructions by the computer's microprocessor. Since machine language or machine code is the only language computers actually understand, all other programming languages represent ways of structuring "human" language so that humans can get computers to perform specific tasks.

While it is possible for humans to compose meaningful programs in machine code, practically all software development today employs one or more of the available programming languages. The most widely-used programming languages are the "high-level" languages, such as C++/C or Pascal.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .exe file) which, after testing and quality assurance, is passed to the user with appropriate installation and usage instructions, or to a factory for installation in products with embedded computer systems.

Development of programs is largely a trial and error process. Errors that emerge from this program development cycle can be divided into broad classes, including compile-time errors, linkage errors, runtime errors, and errors arising at runtime due to unexpected failures beyond programmer control. Examples of such unexpected failures include failures at external resources shared via a network, and failure of the network. Proper development methodologies and quality controls will remove both compile-time errors (such as syntax and format violations) and linkage errors (such as library and global naming inconsistencies), but runtime errors are less amenable to systematic elimination. Indeed, the supreme importance of runtime errors stems from the fact that they are usually discovered by, and provide major frustration to, the end user. Unless handled properly, runtime errors simply abort (terminate) execution, leaving the system in a questionable state and the user uncertain as to what went wrong and what to do next. There are many reasons for the intractability of the runtime error problem. First, it is difficult to predict every user action during program execution. Although the conscientious programmer guides the user with helpful menus and prompts, and aims to insert code that checks the validity of each user response, in practice, it remains a major programming challenge to anticipate and respond to arbitrary user input.

Second, it is difficult, and often impossible, to predict the availability of the diverse hardware and software resources required as program execution unfolds. For instance, the running program might request RAM (random access memory) and disk storage allocations at diverse points of its execution, in the absence of which the program cannot usefully continue. Similarly, the running program might call operating system, library, or other toutines that are, for various reasons beyond the programmer's control, unavailable at that moment. A common error, for instance, occurs when a program seeks access to a file that is not available due to a network failure, for example. As with hardware resource exceptions, the program must either take evasive action or simply terminate (exit or abort). Exceptions of this type are especially common in modem computing environments where a set of independent user applications, or a set of independently executing threads within the same program, must share the same resources.

Apart from resource availability and unpredicted user actions, a further source of runtime errors involves genuine coding bugs not detectable during compilation or linkage. For example, an arithmetical expression, accepted as legal by the compiler, may produce a runtime error for certain values of its variable components. Typical cases are the "divide-by-zero" error and similar situations where the expression cannot be correctly evaluated. Such errors are predictable and avoidable in theory. In practice, however, traditional exception-handling solutions have involved a hard-coded plethora of conditional tests of variable values before each expression is evaluated, followed by ad hoc routines to bypass invalid evaluations. The approach is at best tedious and prone to error.

Most of the high-level languages currently used for program development exploit the concept of modularity whereby a commonly required set of operations can be encapsulated in a separately named subroutine, procedure, or function. Once coded, such subroutines can be reused by "calling" them from any point in the main program. Further, a subroutine may call a subroutine, and so on, so that in most cases an executing program is seldom a linear sequence of instructions. In the C language, for example, a main( ) program is written which calls a sequence of functions, each of which can call functions, and so on. If all goes well, control eventually returns to main( ). This nesting of function calls simplifies the construction of programs but, at the same time, complicates the handling of exceptions. The essence of a function call is that it must pass any arguments (or parameters) to the target function, transfer control to the memory section holding the function's executable code, return the result of the call, and at the same time, store sufficient information to ensure that subsequent execution resumes immediately after the point where the original function call was made. This function-calling mechanism, as is well-known in the art, is usually achieved by pushing and pulling data and memory addresses on and off a stack prior to, during, and after, the call. A stack is simply a dedicated portion of memory usually organized as a LIFO (last in, first out) data structure. The stack is not normally manipulated directly by the programmer, but its contents are changed as a result of the function calls coded by the programmer. Programs do have direct access to another portion of memory, often called the heap, and a key element in exception handling involves the management of this vital resource.

After a successful function call, the stack is unwound, that is to say, all data which were "pushed" onto the stack are "popped" off in reverse order, leaving the stack in its pre-call state ready for further function calls; execution resumes in the function which made the call. Note that, since function calls can be nested to arbitrary levels, the stack must maintain a vital, complex sequence of return values and instruction pointers essential to the proper execution of the program. Eventually, absent any problems, control ends back in main( ), and after the final successful function call in main( ), the program terminates. Any interruption to this unwinding process leads to an unbalanced stack with unpredictable results. For instance, a called function expects to find its arguments in a particular section, known as the function's stack frame, at the top of the stack; if the stack is unbalanced, the function will pull off erroneous data, further compounding the runtime error.

Clearly, exceptional conditions and errors occurring in a nested function can create a particularly difficult problem. Several exception-handling approaches have been attempted to address the problem. One approach, for instance, is to have each function return an error indication, either in a separate variable, or as a special range of values for the normal return value. The immediate onus of exception handling then rests on the calling function. If the calling function is unable to cope, it must return an error indication to its calling function, and so on up the chain until either a function is reached that can handle the exception, or until main( ) is reached. If main( ) cannot correct the problem, it terminates as gracefully as possible, perhaps displaying an explanatory message for the user.

As an illustration, suppose that main( ) calls funcA( ) which, in turn, calls funcB( ). funcB( ) is programmed to return, say, zero for success or a positive number indicating the reason for failure. For example, funcB( ) might return 1 for "insufficient memory," 2 for "file not found," and so on. funcA( ) always tests the value returned by funcB( ). If this test indicates success, funcA( ) carries on and eventually returns control to main( ). If funcA( ) detects that funcB( ) suffered an "insufficient memory" error, it may well be able to correct the situation (by "collecting garbage" or by defragmenting the heap) and then call funcB( ) again. But if funcA( ) detects the "file not found" error, it may have no means of handling this situation other than displaying a warning. Unable to continue, funcA( ) must then return an error value to main( ). What, if anything, main( ) can do with this error will, of course, depend on the particular application.

The merit of this "error chaining" scheme is that the stack is always unwound correctly, but there are several serious disadvantages. Each function in the chain is saddled with code that "looks" for exceptions occurring in its called functions. This code must also "decide" which exceptions can be handled and which ones have to be returned to the calling function. When the function calls are deeply nested, and the number of different exception types increases, the testing and chaining of exceptions becomes a major, error-prone programming headache. A significant obstacle to well-formulated, easy-to-read, maintainable code is apparent from the simple example outlined above. If main( ) is left to handle an exception returned by funcA( ), it may need to know both the type of exception and where the exception occurred. The type of exception is clear from the error code, but the fact that it occurred in funcB( ) and not in funcA( ) or, as the program is changed and extended, some other function in the chain, is not immediately apparent without additional error encoding.

One response to this problem is the global (or long) go to label instruction that can transfer control from any point of any function to a routine residing anywhere in memory, at the address given by the identifier, label. Under this regime, the funcB( ) of the preceding example need not return error codes up the function chain, but, on detecting an error can send control directly to an appropriate exception handler.

For example an exception handler routine at no-mem-handler is presumed to handle all "insufficient memory" errors and, if necessary, use the value of serr to determine in which function the error occurred. In the current terminology, funcB( ) "throws" the "insufficient memory" exception, while the routine at no-mem-handler "catches" the exception.

This simple global go to approach has the merit of offering a single, readable place for each exception handler, but in practice it creates other problems. First, the standard go to instruction in the C and C++ languages operates only within a function; it lacks the required, long-distance power to transfer control between functions. Second, as it stands, the direct transfer to a handler fails to correctly unwind the stack, as described earlier. Finally, and related to the first two objections, additional mechanisms to allow control to return, if necessary, to the throwing function are needed. In order to resume execution in the throwing function on those occasions when the handler is able to "correct" the error, the exception-handling mechanism must allow the preservation and restoration of the state or context of the throwing function.

When funcB( ) throws an exception, for example, its local variables will hold particular values. As the name implies, the scope and existence of local variables is limited to the "life-span" of the function: they disappear when the function yields control. These local values and other parameters such as the current values in the registers of the central processor constitute the state of funcB( ). In particular, the state includes the stack status and the current IP (instruction pointer) that marks the place in memory where execution must be resumed. This state must be completely saved before the handler is called, and then completely restored before execution of funcB( ) can be safely resumed.

Some of the deficiencies of the global go to "solution" have been alleviated by the introduction of two Standard C library functions, setjmp( ) and longjmp( ). setimp( ) can be called in any function at the point at which control should be resumed if a matching longjmp( ) is called in another function. Typically, longjmp( ) is called when an exception is thrown. setjmp( ) takes as an argument the address of (pointer to) a programmer-supplied memory buffer in which the state of the current function will be saved. As discussed earlier, this state holds the processor registers, including the current instruction pointer IP (also called program counter PC), needed to resume execution immediately after the setjmp( ) call. longjmp( ), unlike go to, can transfer control across different functions as follows: longjmp( ) takes as one of its arguments the same buffer address which is used in the matching setjmp( ). When longjmp( ) is called, it recovers the state saved by setjmp( ), and transfers control to the address found in the stored IP, namely the instruction following the setjmp( ) call. Further, longjmp( ) takes a second numeric argument which can be tested in the function that called setjmp( ), thereby providing a mechanism for determining which particular longjmp( ) caused the jump.

In funcA( ), funcB( ), or in any function they call, or in any function these functions call (and so on), the statement "longjmp(aJmpBuf, status); " ensures that the setjmp( ) in funcA( ) will be "recalled" under special circumstances in order to return value status in retval, following which, control will revert to the if (retval) line in funcA( ). In the absence of any longjmp( ) calls in subsequent functions, setjmp( ) returns zero (false), so that the if (retval) test fails. Thus, the setjmp( ) and longjmp( ) pair offer a global go to method for exception handling. Exception handlers can be encapsulated into any convenient set of functions, and after suitable handling, control can, if required, be safely transferred back to the functions in which the exception occurred.

However, the setjmp( )/longjmp( ) solution also has disadvantages. First, there is no guarantee that the function to which longjmp( ) returns is still active. In the previous example, it is possible that fna( ) has already returned, relinquishing its place on the stack, before a matching longjmp( ) is encountered. The only solution to this problem is to restrict setjmp( ) calls to the main( ) program. Second, the stack unwinding problem in the presence of nested setjmp( )s and longjmp( )s requires careful explicit programming. Finally, many popular program overlaying and virtual memory techniques employ special stacks, so that a function's status is not completely stored by setjmp( ). All told, present-day approaches have failed to adequately address the problem of handling exceptions.

The state of local variables are even more complex in languages like C++, where local variables or objects must have special associated functions, known as destructors, which must be called before they disappear.

Some programming languages, for example C++ and other high-level languages have specified mechanisms to ease programming for exceptions, replacing and augmenting the previously described schemes. However, the implementation of these mechanisms is complicated. There are problems that lead to trade off situation between speed and space, which is well documented in the prior art.

A specific problem relates to how to optimally map the location of the return address to the calling function, to information necessary to unwind the stack of calling functions to the point of a handler, or to the point of a decision to call the function "terminate ( )". The information which must be mapped to the return address comprises a pointer to a table which holds necessary data for unwinding the stack-frame, that is restoring registers, restoring the stack pointer and information regarding the general stack-frame layout, and includes a description of allowed and caught exceptions in this frame. Alternatively, the table information could be compacted and stored instead of the pointer. The optimal layout of a stack-frame is highly dependent on the function which calls it, and cannot be guessed without more information than the return address and the value of the stack pointer and/or frame pointer as applicable to a particular implementation. It is desirable for implementation of exception handlers to give as little overhead as possible when the exceptions are not thrown, as they are meant to be used only in exceptual situations.

The predominant implementation in the prior art relates to program counter based tables. However, the time to look up the table of program counter ranges using a current value of the return address is relative to the size of the program. Given a binary search, which is typically used, the time of the search is logarithmic based on the number of calls in a program. Of course, this searching technique could be optimized using hash functions and the like known in the art. However no known implementation uses the hash function solution, probably because it would introduce an extra linker step and the time of the search is not considered important to many designers.

An alternative implementation is based on providing information to locate the information by storing it at locations that are addressed in the code which calls the exception close to the return address. However, the prior art techniques require program space or processor overhead in skipping the extra information in the calling code, using conventional calling techniques. For example, the skipping could be implemented at the return, with any instruction having no visible effect on the data flow such as a no operation NOP with an unused data or address field costing program space, or a move instruction which moves otherwise unused data, in which the unused field or data holds the desired information for the exception handler costing program space and processor overhead. See, *Chase, Implementation of Exception Handling, Part* 1. *The Journal of C Language Translation* (ISSN1042–5721), Volume 5, Number 4, June 1994 (second part in Volume 6, Number 1, September 1994).

SUMMARY OF THE INVENTION

According to the present invention, the in-code context data is incorporated into a special call instruction which is recognized by the processor. The information is skipped at the time of the function call and read at the time of the stack unwinding. This special call instruction may be implemented to run at no extra cycle costs compared to normal instructions, except for the external execution time dependencies from such machinery as a cache involved in the instruction fetching, since it would never be necessary during normal execution to actually access the information. The information is only accessed during exception handling.

The amount of skipped information is preferably fixed, and holds enough data to include a pointer to information for the specific stack layout, information about local try blocks, and clean up information, or enough to hold a pointer and compressed context data. The actual context data could be compressed using conventions such as addresses never being odd or negative, so that the in-code information includes actual data needed for stack unwinding. Thus, the skipped information could be regarded as a field in the instruction which causes the exception to be thrown. Alternatively, the skipping can be seen as a side effect of the instruction.

Accordingly, the present invention provides a new microprocessor or other data processing system with a new command labeled herein JSRC, standing for jump to subroutine with context data. The new command has all of the features of the traditional jump to subroutine commands, plus an extra long word that contains an address to the context table, actual context data, or a combination of both. Context information is used to keep track of which part of a given function code is executing when the exception is thrown. When the function is executing, and an exception occurs at some random point, the context table allows the system to determine what clean up is necessary before the stack frame may be thrown away, and whether there exists any try-blocks that are active during the exception. For a given function, the context table is constructed which describes the effective layout of the function that are used for these processes. This context data is produced by the compiler, which compiles function calls wrapped in a try-block with a new instruction as outlined above containing in-code context data. This instruction can be understood by contrasting it with the standard JSR instruction that does not include the in-code context data as described in more detail below.

A stack unwinder in the exception manager unwinds the stack in a manner identical to the prior art, with the exception that it is able to locate context tables for each function popped from the stack during unwinding more quickly because there is no need to search the context records for a match. Rather, the in-code context data of the JSRC instruction is used to go directly to the correct context record.

Thus the present invention can be characterized as a data processing system responsive to instructions in a set of instructions to execute a process. w The system comprises instruction fetch logic which fetches instructions in a set of instructions to provide a sequence of instructions in response to an instruction pointer, or a program counter. The set of instructions includes a context-call-instruction (e.g. JSRC) having a normal length followed by in-code context data having a determinant length utilized in execution of an exception manager responsive to the context-call-instruction. Instruction decode logic is coupled to the instruction fetch logic and decodes a current instruction in the sequence for execution. The instruction decode logic includes logic to detect the context-call-instruction. Execution resources are coupled to the instruction decode logic which execute the decoded instructions. Logic is coupled to the instruction fetch logic which updates the instruction pointer in response to the detection of the context-call-instruction by the instruction decode logic. In response to the detection, the instruction pointer is jumped over the in-code context data to another instruction in the sequence so that the in-code data does not effect the normal processing of the instruction.

According to another aspect of the invention, the system includes a program store coupled to the instruction fetch logic in which instructions in the set of instructions are stored in locations accessible in response to the instruction pointer. The in-code context data is stored following the context-call-instruction by an offset amount of zero or more bytes, and the logic which updates the instruction pointer jumps over a field of data at the offset having a length equal to the determinant length.

As mentioned above, the sequence of instructions comprises one or more functions that are characterized by unwind information, and layout information that is used to unwind the one or more functions for processing of the context-call-instruction. The in-code context data comprises at least a subset of the unwind information, and/or a subset of the layout information. In an alternative system, the in-code context data comprises a pointer to a memory location storing the information regarding a context for use by the context-call-instruction. In alternative embodiment, the in-code context data comprises a plurality of bytes of data, and includes a field for specifying a format for the plurality of bytes. Thus for example the field indicates whether the plurality of bytes includes immediate context data, and whether the plurality of bytes includes a pointer to context data in another memory location.

According to other aspects of the invention, the determinant length of the in-code context data is predetermined, so that the instruction decode logic is capable of automatically upgrading the program counter without further processing. In other embodiments, the determinant length of the in-code context data may be determined at the time of instruction decode.

The present invention can also be characterized as a method for processing instructions in the data processing system that comprises storing instructions from a set of instructions in addressable memory. The set of instructions includes an context-call-instruction as discussed above. The method includes fetching a sequence of instructions from the memory in response to an instruction pointer identifying an address in the addressable memory. Next, a current instruction is decoded including detecting the context-call-instruction. The instruction pointer is updated by the normal length of the context-call-instruction plus the determinant length of the context data in response to detection of the context-call-instruction, else the instruction pointer is updated by the length of the current instruction, which includes any operands if appropriate. Next, the context-call-instruction is executed to call a function as a normal call-instruction would. The called function normally returns by the same means as from a normal call-instruction. If however, the called function does not return normally, but rather an exception is thrown, which in turn happens to be not handled until stack unwinding reaches the point of this call, the stack unwinder will read the in-code context data, at an address in the addressable memory determined in response to a function of the instruction pointer. The in-code context data then holds information necessary to find any local exception handler, stack layout and cleanup information.

Accordingly, the present invention provides a computer system for executing programs. The system comprises a microprocessor and memory that includes a stack memory for storing function arguments and local data. A set of instructions in the microprocessor and executable by the microprocessor provides for data flow and control flow necessary to execute a representation of a program using the language defined by the set of instructions. One or more of the instructions consist of a context-call-instruction. The special function call instruction is associated with a data field for carrying in-code context data at a fixed point relative to the perceived return address for the function call, or other addressing side effects in the special function call instruction to that effect. The data field is large enough to hold information regarding the layout of function arguments, local data and information necessary for unwinding the function in processing synchronous or asynchronous exception information in one embodiment. Alternatively, the data field is large enough to hold information necessary for retrieving the location of information regarding the layout of function arguments, local data and information necessary for unwinding the function and processing synchronous or asynchronous exception information. The data field is processed by the microprocessor in a manner that does not add to the execution time of the named function call instructions specifically. A preferred embodiment is a variant of the JSR instruction in the CRIS architecture of AXIS Communications AB described in the 'AXIS ETRAK: CRIS Programmers Reference', 1994 edition, available from "Technical Publications, Axis Communications, Scheelevagen 16, S-22370 Lund, SWEDEN" or from <cu-tpub@axis.com>, which is incorporated by reference as if fully set forth herein.

Other aspects and advantages of the present invention can be seen upon review of the figures, the detailed description and the claims which follow.

BRIEF DESCRIPTION OF THE FIGURES

FIG. 3 illustrates the layout of the JSRC instruction with regard to specific embodiments compared to a normal call instruction.

FIG. 6 is used for describing the processing of the JSRC instruction in a microprocessor according to the present invention compared to a normal call instruction.

DETAILED DESCRIPTION

A. System Hardware

Figure 1:
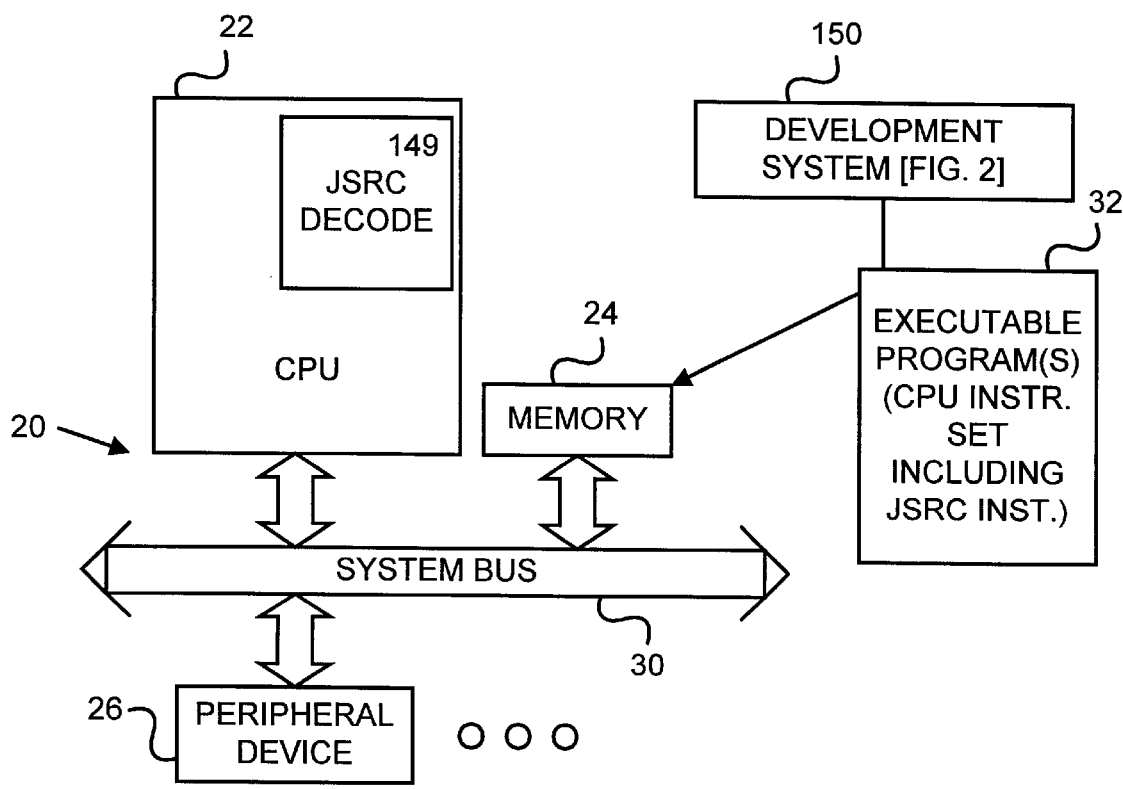
FIG. 1 is a simplified block diagram of a computer system including a processor for executing the context-call-instruction of the present invention.

The present invention may be embodied on a computer system such as the system 20 of FIG. 1, which includes a central processor 22, a main memory 24, and peripheral devices 26 including for example an input/output controller, a keyboard, a pointing device (e.g., mouse, track ball, pen device, or the like), a display device, and mass storage (e.g., hard disk). Additional input/output devices, such as a printing device, may be provided with the system 20 as desired. As shown, the various components of the system communicate through a system bus or similar architecture.

B. System Software

The following description will focus on the presently preferred embodiments of the present invention, which may be advantageously applied to a variety of platforms and environments, whether command-line or GUI based, including MS-DOS, Macintosh, UNIX, NextStep, Microsoft Windows and the like. Therefore, the description of the exemplary embodiments which follows is for purposes of illustration and not limitation.

As illustrated in FIG. 1, executable programs 32 are provided for controlling the operation of the computer system. The programs stored in system memory 24 and on disk memory, include a kernel or operating system (OS) and typically a windows shell or interface. In some embedded systems, no user interface is provided. One or more application programs, such as application programs or windows applications programs, may be "loaded" (i.e., transferred from storage into memory) for execution by the system. The programs 32 also include a development system 150 of the present invention for developing system and application programs. As shown, the development system 150 includes components which interface with the system through windows shell, as well as components which interface directly through OS.

Development system 150 in this example includes Borland Registered TM C++, available from Borland International of Scotts Valley, Calif. Application software on the other hand, can be any one of a variety of application software, including word processing, database, spreadsheet, text editors, control applications, network appliance driver software, and other user and embedded applications.

The CPU 22 includes logic 149 supporting, and the development system 150, including components supporting the special JSRC instruction for handling exceptions according to the present invention.

C. Development System

Figure 2:
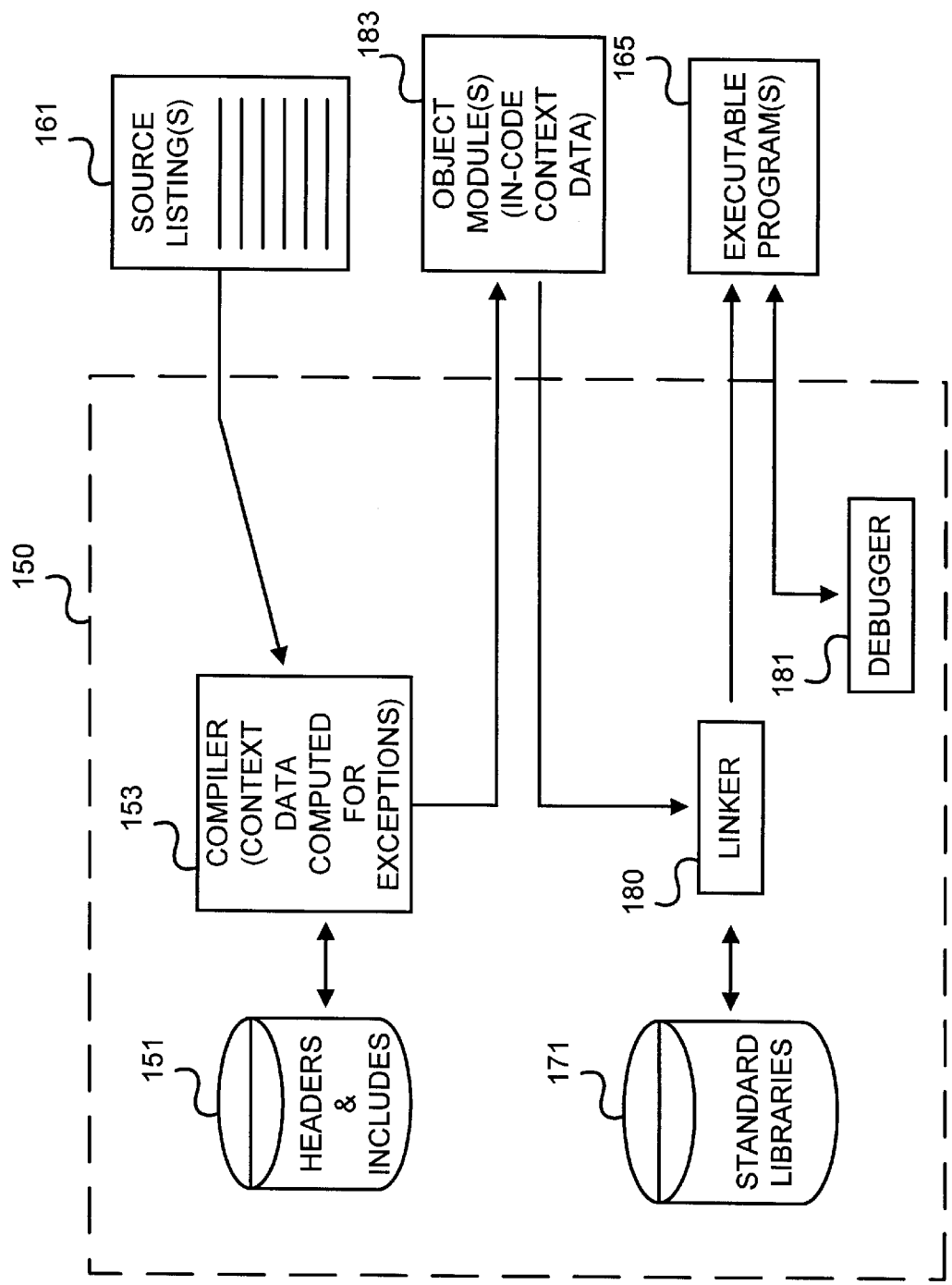
FIG. 2 illustrates a software architecture for a development system to be executed by the computer system of FIG. 1 or other computer systems compiling software including resources for the JSRC instruction of the present invention.

Shown in further detail in FIG. 2, the development system 150 of the present invention includes a compiler 153, and a linker 180. Through an interface, the developer user supplies source modules 161 to the compiler 153. Interface includes both command-line driven and Integrated Development Environment (IDE) interfaces, the former accepting user commands through command-line parameters, the latter providing menuing equivalents thereof From the source code listings 161 and from headers/includes files 151, the compiler 153 "compiles" or generates object module(s) 163. The compiler 153 inserts the special JSRC instruction at appropriate places in the code, and computes the associated context data. Depending on the format of the context data, the in-code portion of the context data is formulated and placed in the object modules in a field having a predetermined length following the JSRC instruction itself The balance of the context data is placed in a table with other context data associated with the program to be executed, and a pointer is included in the in-code context data to the position in the table at which the balance of the context data is included. In alternative systems, the context data for a given call may be compressed and included in the in-code context data field completely. In turn, linker 180 "links" or combines the object modules 163 with libraries 171 to generate executable program(s) 165 (corresponding to block 32 of FIG. 1), which may be executed by a target processor (e.g., processor 22 of FIG. 1). The standard libraries 171 include previously-compiled standard routines, such as graphics, I/O routines, startup code, and the like. A debugger 181 is provided for handling runtime errors in the programs 165 according to the JSRC technique of the present invention. A description of the general operation of a representative development system 150 of the prior art is provided with Borland Registered TM C++, available directly from Borland International.

A debugger 181 may be provided to catch runtime errors and/or exceptions thrown from within the programs 165 or libraries 171. The debugger may intervene in the actions of an exception-handling module that may come from the libraries 171 or be emitted as internally generated code 165 by the compiler 153. The exception handling module (exception manager), called from code emitted by the compiler 153 when an exception is thrown, manages unwinding of the stack, cleanup of local objects, locating and executing exception handlers. The exception handling module is part of the executable code 165. The exception handling module uses the context data according to the JSRC technique of the present invention.

The exception handlers in the executable program 165 as well as the debugger module 181 are provided with resources to access the in-code context data in response to the throwing and catching of an exception. The location of the in-code context data for a thrown exception can be determined with a function of the value in the program counter of the microprocessor as described in more detail below. In a preferred embodiment, where the in-code context data is offset by zero bytes from the end of the JSRC instruction and its operands as normally present in the JSR instruction, and has a predetermined length of for example 4 bytes, the location of the in-code context data is simply the program counter minus 4 bytes. An explanation of the control of the program counter is provided below.

Detailed background concerning the problem of locating exception handling in the prior art can be found with reference to U.S. Pat. No. 5,628,016, and elsewhere.

FIG. 3 illustrates the implementation of the jump to subroutine with in-code context data instruction JSRC of the present invention, as compared to the standard JSR instruction at the assembly code and binary levels.

In the first row 301, the assembly code label for the JSR instruction which carries as an operand the label "A_function." The operand "A_function" is represented by the value 0x135ef382 in hexadecimal. The second row 302 illustrates the binary value which would be stored in an executable file, with the least significant byte (82) first. The third row 303 illustrates the layout of the JSRC instruction according to the present invention which carries as parameters the address of the function "A_function" and the in-code context as the address of the context table labeled "This_context_table." The binary value for this instruction is illustrated in row 303. The address of this context table in hexadecimal is represented by 0x5577aacc.

An alternative embodiment of the instruction carries a reference to a register rather than a parameter as an argument in the JSR and JSRC instructions. Thus in row 305 the standard JSR instruction carrying as argument the register address R5 is illustrated. In this embodiment for the JSR instruction, the reference to register R5 is carried in the least significant byte in the instruction. The binary representation of this is illustrated in row 306. In row 307, the JSRC instruction according to the present invention which carries the register address R5 as an argument is illustrated. The binary representation is shown in row 308.

For this example, the standard hexadecimal representation of the JSR instruction is 0xbd3f and the standard hexadecimal representation of the JSRC instruction is 0x3d3f.

In an embodiment carrying compressed context data, the field may be determined according to the following example. Here, we assume there are seven registers used for general purposes, named r0 up to r6. Assume that the context information we need for this call-point includes stack layout, try-block-context, local objects that need destruction, and exception handlers aka. catch-blocks.

Assume that the common case is that there are no objects that need destructors to be called, no "open" try-blocks or catch-blocks for this call-point, so using the compressed format implies that those lists are empty.

Assume also that the stack-pointer is used as the base for this context.

Those 31 bits now just have to encode the stack layout, which for the preferred embodiment would be:

The offset to the return-address of the caller.
What registers are saved.
Amount of stack allocated for local variables.

Assume that the normal case is that the stack-frame is no larger than 16 Kbytes, so we take 14 bits for the offset to the return-address of the caller. Local variables may then also take up 16 Kbytes; that's another 14 bits. The number of saved registers are most often less than seven, (often continuous from r0 and up, stopping at r6), so we need only three bits (zero=no registers) for that.

bit#: Meaning:
 0 The context is in compressed form=1, pointer to table= 0.
 Assuming bit 0 is 1:
 1 . . . 14 Offset of callers saved PC (the return-address).
 15 . . . 28 Amount of local variables, counted in bytes (the adjustment needed to the stack-pointer).
 29 . . . 31 Coded information on saved registers: none, r0, r0 . . . r1, . . . , r0 . . . r6

The second field may be deduced from the first and the third field, so more information can fit here, perhaps something from the previously assumed empty lists. For example, perhaps 15 bits could be used as an offset from this location in the code to a simplified table.

This compressed format then means we do not have to emit any table with this information for most of the call-contexts, and so can save a lot of memory.

Thus, the compiler inserts the JSR code at appropriate places in the object modules being compiled if the in-code context data is not appropriate for the particular instance. For instances in which the JSRC in-code context data is appropriate, then the compiler inserts the JSRC instruction in the form illustrated.

Figure 4:
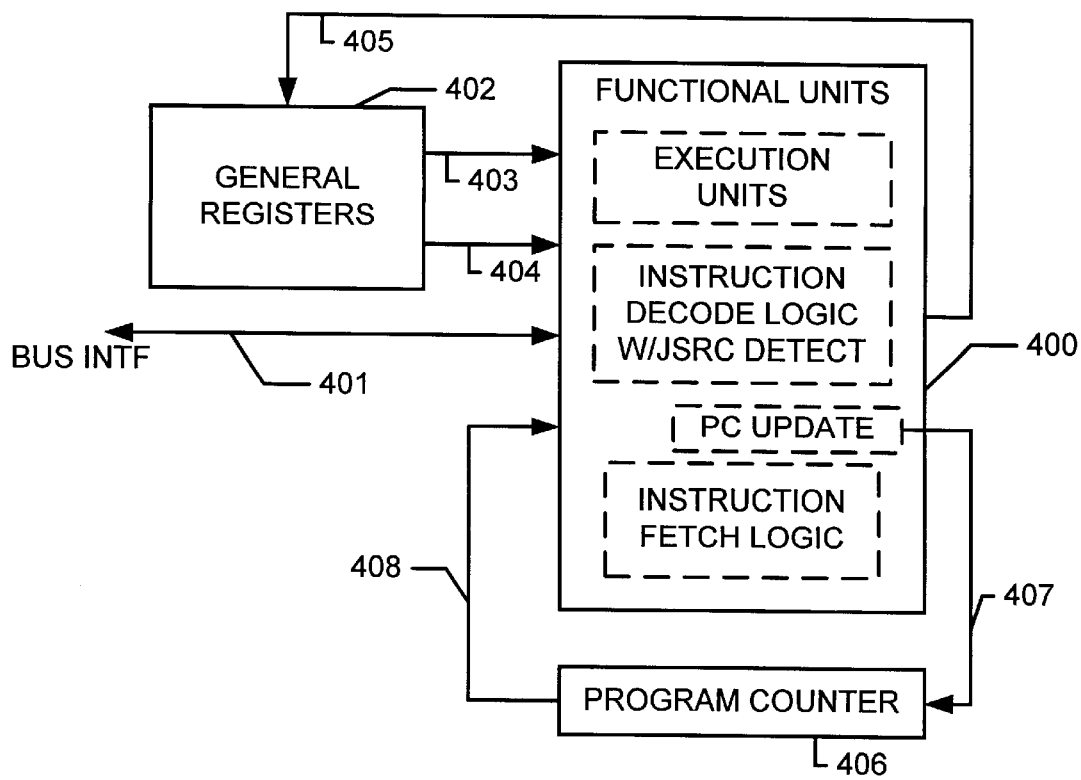
FIG. 4 is a simplified block diagram of a microprocessor according to the present invention including resources for handling the JSRC instruction of the present invention.
Figure 5:
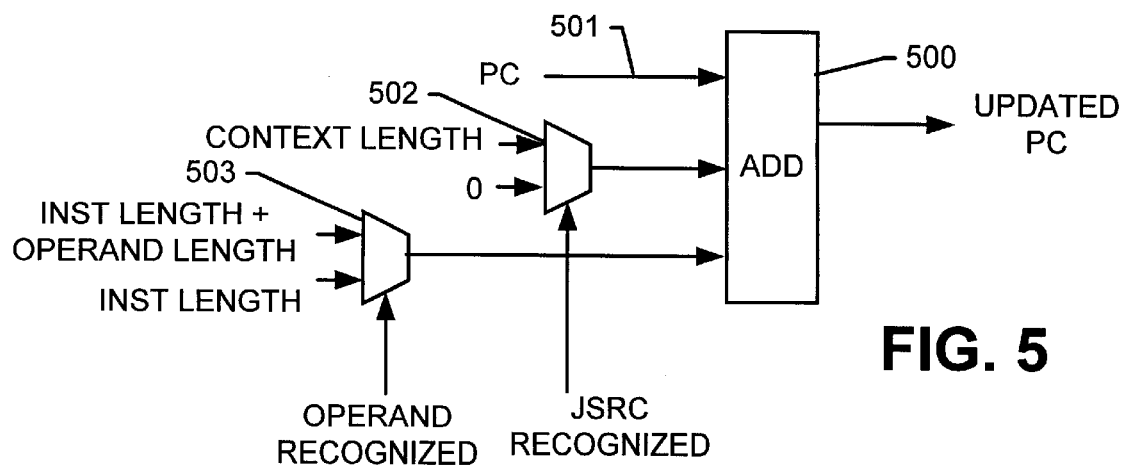
FIG. 5 is a simplified block diagram of the program counter update logic according to the present invention.

In execution of the instruction, the program counter and instruction fetch logic associated with the processor using this technique are responsive to detection of a JSRC instruction to increment the program counter, or other equivalent instruction pointer, around the in-code context data that does not need to be read in normal processing. Thus, FIGS. 4 and 5 illustrate the structure of a microprocessor configured to execute the JSRC instruction, and the logic for incrementing the program counter in the context of a JSRC instruction according to the present invention. Thus, FIG. 4 is a simplified diagram of a processor or CPU implemented according to the present invention. It includes a plurality of functional units 400. The functional units 400 include execution units for arithmetic and logic functions, instruction decode logic that includes logic that detects and decodes JSRC instruction of the present invention, program counter update logic (PC update), and instruction fetch logic which is used for producing a sequence of instructions for execution by the processor in response to the program counter and the results of execution of other instructions. Thus the instruction fetch logic provides for management of instruction caches, branch instructions and the like.

The functional units 400 are coupled to the system bus across line 401 through a bus interface. Line 401 may constitute one or more buses for carrying input data and supplying output data. Also, instructions from an instruction store and addresses for retrieving data and instructions are supplied across the bus interface. Within the processor, typically plurality of general registers 402 commonly referred to as a register file is provided. Typically it is a three port memory unit which supplies operands on lines 403 and 404 to the functional units, and receives results to be stored from the fictional units across lines 405.

In FIG. 4, the program counter 406 is shown as a register independent of the general register file 402. Of course in various embodiments it could be considered. as part of the register file. The program counter 406 is coupled to the program counter update logic within the functional units across line 407 and feeds the program counter value back to the functional units for use by the instruction fetch logic and other functional units as appropriate across line 408.

Thus according to the present invention, the functional units of the processor are adapted to recognize the JSRC instruction and control the updating of the program counter in response.

FIG. 5 illustrates the program counter update logic in a simplified version for use in the system of FIG. 4. As described above with respect to FIG. 3, the JSR and the JSRC instructions come in a variety of formats for various addressing modes, including a first format that carries an operand in the code, and a second format which carries a register identifier as part of the instruction.

The PC update logic illustrated in FIG. 5 consists essentially of an adder 500 which adds the value PC of the program counter from line 501 with the output of a first selector 502 which is controlled by a signal indicating that the JSRC instruction has been recognized, and the output of a second selector 503 which is controlled by a signal indicating that the instruction carries an operand that takes up more space than the instruction, or not. Thus, in the case of an instruction which does not carry an operand the output of a selector 503 is the instruction length, for example 2 bytes. In the case that the instruction carries an operand, and the decode logic has read the operand then the output of selector 503 is the length of the operand, which for the example of FIG. 3 is 4 bytes. If the instruction is a JSRC instruction, the output of the selector 503 must be combined with the length of the in-code context data. Thus the selector 502 selects either zero bytes if the JSRC instruction is not recognized or the predetermined context length if the JSRC instruction is recognized. These three values are added together by adder 500 and supplied back to the program counter as the updated program counter value. This updated program counter value in the case of JSRC instruction is utilized by the exception manager to find the in-code context data.

In the embodiment of FIG. 5, the context length is a predetermined value associated with a particular JSRC instruction. In various embodiments, the length of the context data can vary according to the needs of a particular implementation or instance of the jump to subroutine instruction. Thus, the jump to subroutine instruction may be provided in more than one instance for various context lengths. In this case, the program counter update logic would have to recognize the particular instance of the JSRC instruction and add the appropriate context length. Alternatively, the JSRC instruction could carry as a parameter a value which is equal to the context length to be added to the program counter. In this case, the context length might be retrieved from the general purpose registers where otherwise provided by the functional units of the processor.

FIG. 6 is utilized to describe the process of executing the JSR and the JSRC instructions according to the present invention. In the first row 600, the JSR instruction is described. As the processor executes the instruction it first reads the instruction, decodes the instruction and updates the program counter to the location following the instruction in cycle 1 up to cycle N1. From cycle N1 up to cycle N2 the operands if any carried with this instruction are read. The program counter is updated to the location after the operands. In cycle N2 up to cycle N3, the program counter is stored at the location of the return address for the subroutines and any related entity such as the stack pointer are updated according to the standard execution processes for the JSR instruction. In cycle N3 up to N4 the next instruction is read at the target of the call, and the subroutine is executed.

According to the JSRC instruction, in cycle 1 up to cycle N1, the instruction is read and decoded. The program counter is updated to the location after the instruction. In cycle N1 up to cycle N2 the operands are read and the program counter is updated to the locations of the operand plus the length of the in-code context data which in this embodiment would be a fixed size. In cycle N2 up to cycle N3, the program counter is stored at the location of the return address and any related entities are updated. In cycle N3 up to cycle N4, the next instruction is read at the address of the call and the subroutine is executed.

However, the exception manager needs to read the in-code context data, using a function of the program counter value to find the data. In particular, the beginning of the data will be determined by a function which is equal to the value of the program counter plus an offset of zero less the length of the code word. In this manner, the in-code context data is automatically associated with the calling function. Also, the in-code context data does not interfere with normal processing or cost extra cycles in normal execution.

Accordingly, the context or a pointer to the context is located at the offset of the return address less 4 in the preferred embodiment. Once the return address is found, the exception manager finds the in-code context data without requiring searching tables and matching values.

The information in the in-code context data in this embodiment is 4 bytes or 32 bits. The 32 bits is either context or context pointer, or a combination of both. In the preferred embodiment there is a preferred alignment of 32 bits for data. This assumption can be used to encode at the least significant bits whether the rest of the 32 bits are a pointer or actual compressed context data with some information fixed. Thus, pseudocode for an exception manager and stack walker function which could utilize the JSRC in-code context data of the present invention follows:

---

© Axis Communications AB 1998

```
/*      Get a pointer to the context information for the function
        with the return address of "pc_return_location".
        Remember, "char" is byte-sized
        (8 bits).
        If the context is of the compact kind, expand it into the
        structure in "expanded context", before returning a
        pointer to *that* (overwritten at next call). */
void *f(void **return_pc_stack_location)
{
  static struct exception_context expanded_context;
  /*      Offset -1 for a pointer-size object means -4, counted in bytes. */
  void *context_or_pointer = return_pc_stack_location[-1];
  /*      Since all exception-tables are aligned on addresses that are
          a multiple of two, we code the "compacted context" property
          in the lowest bit in the plausible pointer; if it is zero, then this
          is a pointer, if 1, it is a compacted context. */
  if ((((unsigned long int) context_or_pointer) & 1) == 0)
  {
```

-continued

© Axis Communications AB 1998

```
        /* It was a pointer, just return it. */
        return context_or_pointer;
     }
     else /* Compacted form. */
     {
        . . . Expand the compacted form, from "context_or_pointer" into
            "expanded_context" . . .
        return &expanded_context;
     }
  }
  /*    We happen to know where the return-address to the caller of this
        particular function (stack_walker) is; it's just at the
        stack-pointer "sp", offset −8.
        Portability issues omitted for brevity. */
  void stack_walker(void)
  {
     void**return_pc_location;
     struct exception_context *contextp;
     /* Inline-assembler magic for getting the stack-pointer value. */
     asm("move.d sp, %0" : "=rm" (return_pc_location));
     return_pc_location=8;
     contextp = f(return_pc_location);
     /*    Just loop through the callers (assuming none have specified
           "throw()"), starting from this function, using the
           context-tables. Print the return-address of each as an
           example.
           Don't worry about compressed context information, "f(PC)"
           handles that.
           The "root" call to "main()" and global constructors is
           marked with a "zero" context; we will get it as NULL.
           When we do, stop there.
           (BTW, if the search for a handler reaches that,
           "terminate()" is called).
           This same loop-construct can be used to implement the
           loop-part of stack-unwinding and
           exception-handler-search. */
     while (contextp !=NULL)
     {
        printf "Called from: % p ", *return_pc_location);
        /* Update return_pc_location and context associated with
        that caller. */
        return_pc_location
        =return_pc_lcation + contextp->offset_of_return_address;
        context+f(return_pc_location);
     }
  }
```

The compiler in a preferred embodiment of the present invention for the C++ language is responsible for generating exception tables. According to the present invention, the compiler is modified to provide a portion of the exception tables or a pointer to the exception tables as in-code context data in connection with the JSRC instruction.

The following provides an example pseudo-code of a program in which the JSRC instruction of the present invention would be utilized according to the C++ language.

```
 1  class To_be_thrown
 2  {
 3  public:
 4     To_be_thrown(char *message) : the_message(*message) {}
 5     ~To_be_thrown() {}
 6     const char *message() { return the_message; }
 7  private:
 8     const char *the_message;
 9  };
10  class Foo
11  {
12  public:
13     Foo(int a) : value (a) { printf ("Foo:% d ctor called\n", value); }
14     ~Foo()        { printf ("Foo:% d dtor called\n", value); }
```

-continued

```
15  private:
16     int value;
17  };
18  extern void wont_throw(const char *) throw();
19  extern void maybe_throw(const char *);
20  extern void indirect(void (*)(const char *), const char *);
21  void middleman()
22  {
23     Foo foo_1(1);
24     maybe_throw("This");
25     wont_throw("That");
26     indirect(maybe_throw, "Whatever");
27     Foo foo_2(2)
28     maybe_throw("Something");
29  }
30  void indirect(void (*f)(const char *), const char *sc)
31  {
32     chars[10];
33     strncpy(s, sc, 9);
34     f(s);
35  }
36  void doit(void)
37  {
38     try
39     {
40        middleman();
41     }
42     catch (To_be_thrown what_is_thrown)
43     {
44        printf("% s was thrown\n",
45              what_is_thrown.message());
46     }
47  }
48  void catchall()
49  {
50     try
51     {
52        doit();
53     }
54     catch(. . .)
55     {
56        printf("Something unknown was thrown\n");
57     }
58  }
59  void maybe_throw(const char *s)
60  {
61     if (strcmp(s, "Whatever") ==0)
62     {
63        throw(To_be_thrown("Gotcha!"));
64     }
65  }
```

Here is an example of extracted code that would use the JSRC instruction. The catchall( ) function is called from somewhere else, and is at the top of the call chain, for purposes of the example here and in FIG. 7.

The first instance in the program at which the JSRC instruction would be utilized, is the first call point (line 24) at which exception context information is utilized. The information would include for this example how to destruct foo_1, how to restore the stack-frame (registers, etc.) from "middleman( )", including how to find a return address. For line 25, no context information is needed because the function wont_throw will not throw any exceptions, as can be seen from the no-throw "throw( )" attribute in its declaration. At the next call point (line 26), context information is stored. At this point context information is needed for how to destruct foo_2, how to destruct foo_1, how to unwind the stack-frame from "middleman( )", and including how to find a return address. The next call-point is to the standard function "strncpy( )" at line 33, but since it never throws exception (known by the compiler or from declaration in its header file not included here), no context information is needed, so the normal JSR call instruction is used. The call point after that is the function f(s) at line 34. The context information for this call point includes how to restore the stack frame from "indirect( )" including how to find a return address for indirect. Next, exception context information is utilized for the "middleman( )" call at line 40. This information catches the class to be thrown, states where to copy the thrown object and the location of the handler, states how to restore the stack frame from the "doit( )" function including how to find a return address. The next call point at which an exception context information is stored is the "doit( )" call at line 52 in catchall( ). At this point, the context information indicates that it catches anything, identifies the location of the handler, and states how to restore the stack-frame, including how to find a return address. In this example, there is an exception being thrown at line 63. At this point, the thrown object is created. The search for a handler and the stack unwinding start. Since this code does not contain other exception information, the stack is unwound looking for relevant exception information.

Figure 7:
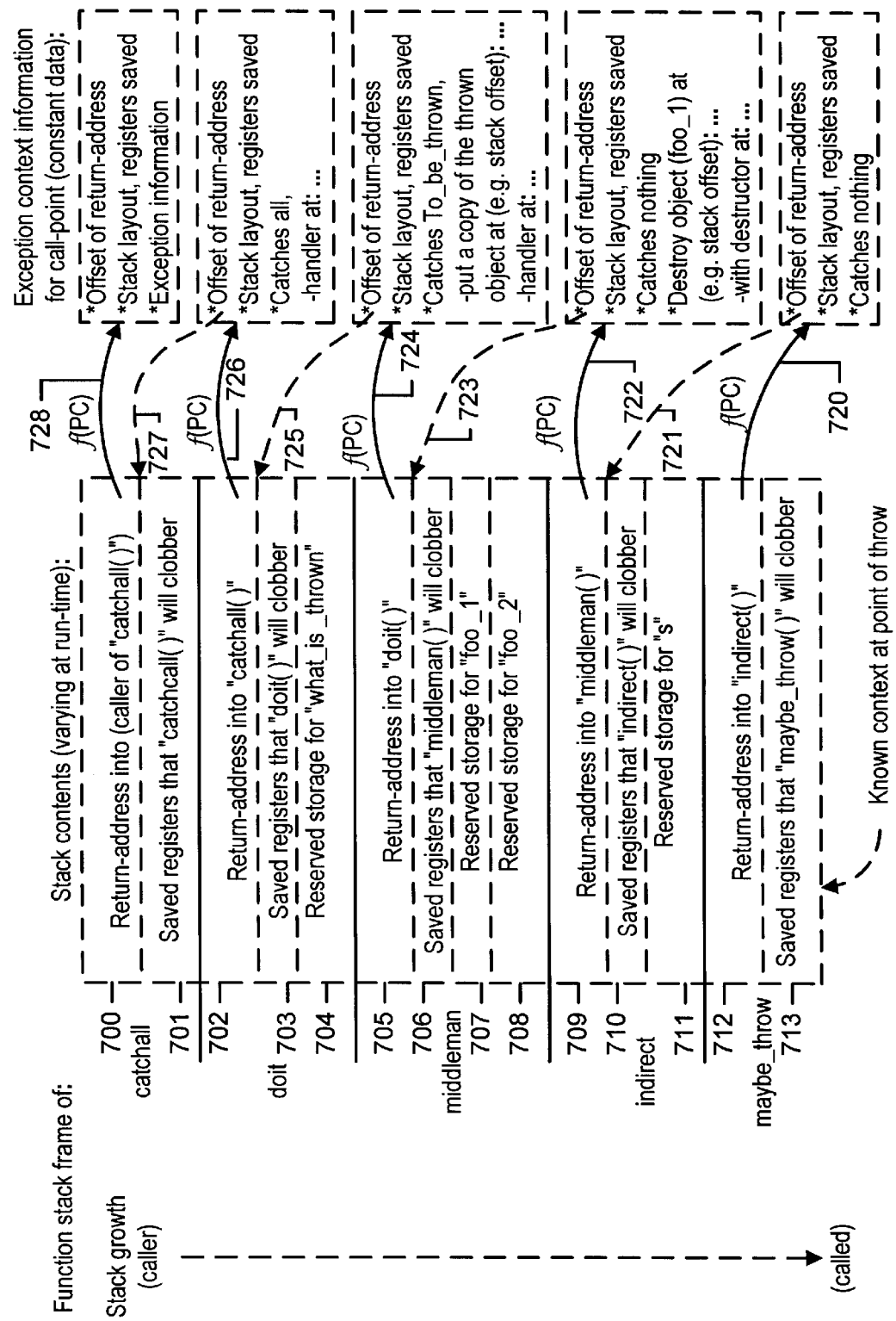
FIG. 7 illustrates stack growth and context data used in explanation of the present invention.

FIG. 7 illustrates the growth of the stack according to the example code discussed above. Thus, in this example the process starts by a call to the "catchall" function. The stack grows with a return address of the caller at line 700 and save registers that "catchall" will clobber at line 701. The "catchall" routine calls the "doit" function. The stack grows by storing the return address into "catchall" at line 702, saved registers that are clobbered by "doit" at line 703 and reserves storage for the object "what_is_thrown" at line 704 which will be filled in when the exception is thrown, and a matching try block is found here. The "doit" function calls the middleman function. The stack grows at this point with the return address into "doit" (line 705), saves registers that "middleman" will clobber at line 706, and reserves storage for the objects foo_1 and foo_2 in line 707 and 708. The "middleman" function calls the "indirect" function. When this occurs the stack grows by storing the return address into "middleman" at line 709, registers that "indirect" will clobber at line 710, and storage for the local array "s" at line 711. The function "maybe_throw" is also called. At this point the return address into "indirect" is stored at line 712 and registers that "maybe_throw" will clobber which are known at the point of the throw are stored at line 713. When in maybe_throw, the conditions for throwing an exception are met, and an object of type "To_be_thrown" is thrown. The stack-unwinding, and search for an exception handler, use the context information related to the saved return address. The immediate context of the throwing function, that is, saved registers and offset of the return address of the caller, is known at the time of compilation, and can be directly used at the "throw".

Figure 8:
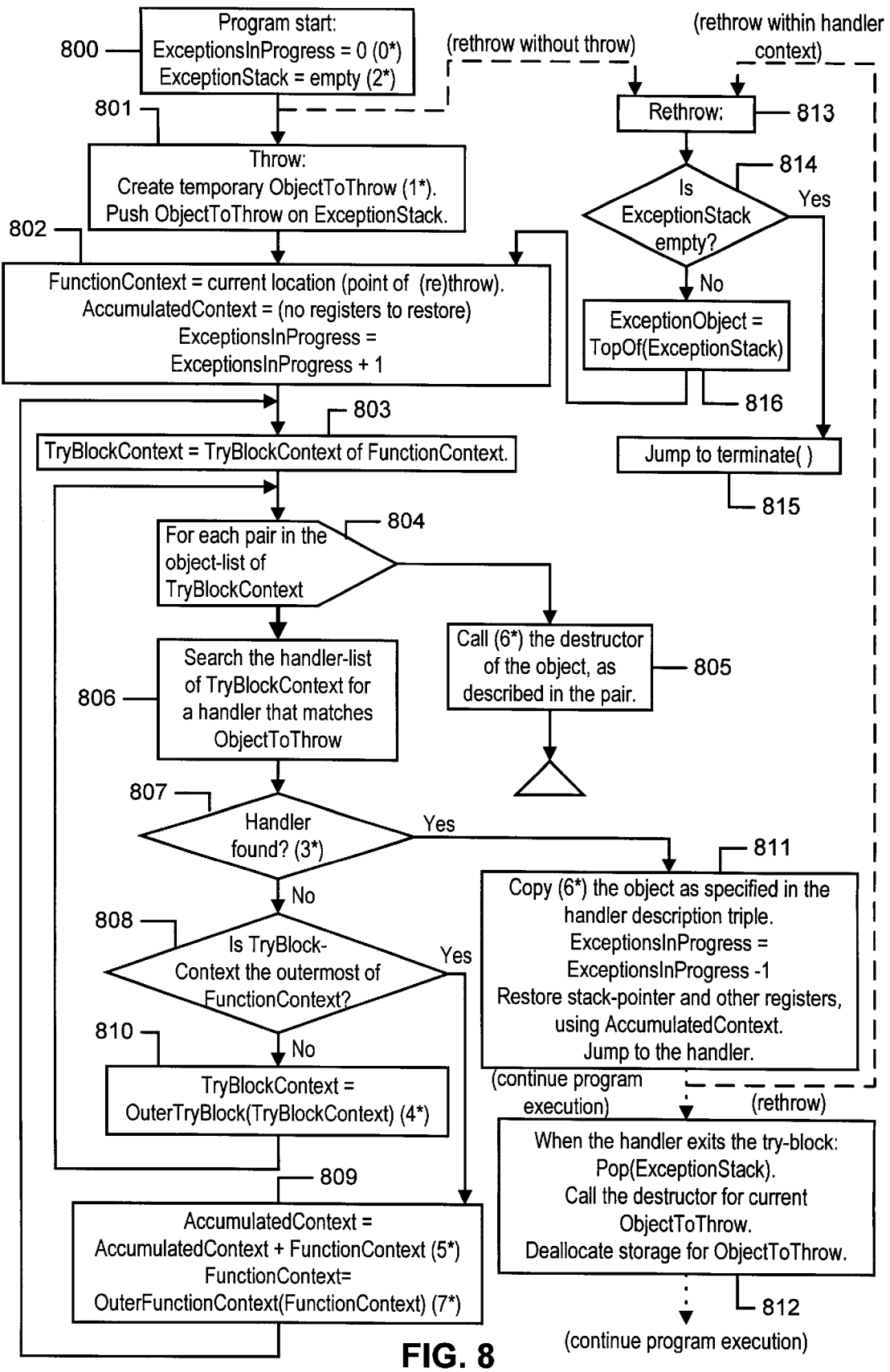
FIG. 8 provides a flow chart of one example exception manager according to the present invention.

This stack must be unwound using an exception manager such as illustrated in FIG. 8. At program start as indicated at block 800, a parameter ExceptionsInProgress is zero and the exception stack is empty. Using the ExceptionsInProgress counter makes tracking unhandled exceptions simple. Any exceptions that are not caught in the process will result in the counter being non-zero on return. The exception stack data structure is used to take care of nested exceptions. That is sometimes exceptions are thrown during destructor calls when doing stack unwinding, but taken care of inside of the destructor call. The exception stack enables this type of processing.

When an exception is thrown as indicated at block 801, a temporary ObjectToThrow is created and the ObjectToThrow is pushed on to the exceptions stack. The storage for the thrown object is implementation dependent. However, a heap should be used, preferably separate from the heap where new objects are allocated from. The construction of the temporary object must be guarded from the exceptions, possibly by adding a state variable (TempInCreation) that is normally false, but only true when creating a temporary object. The algorithm then proceeds to set a function context equal to the current length location of the point of the throw or rethrow. The accumulated context is set equal to no registers to restore and the exceptions in progress variable is incremented (block 802). Next, the try block context is set equal to the try block context of function context (block 803). For the example in FIG. 7, this is the context of the function where the "throw" is executed; "maybe_throw( )" around line 713.

For each pair in the object list of the try block context, as indicated at block 804 the destructor for such object is called (block 805). When these operations call destructors or copy constructors, those calls must make sure that they do not let through any exceptions. This can be accomplished by wrapping the calls in the effects of a "try {[call]}catch( . . . ) {terminate( );}" block.

After the destructors are called, the handler list is searched of the try block context for a handler that matches the object to throw (block 806). At block 807, a decision is provided based on whether a handler is found. From the flow chart, it may look like function exception declarations are not asserted. However they are supposed to be implemented by the compiler adding an implicit try block to be the outermost of the function, that catches any violations, and transforms them into calls to "unexpectedo", "terminate( )" or into the effect of "throw std::bad_exception".

If the handler is not found at block 807, then the algorithm determines whether the try block context is the outermost of the function context at block 808. If it is the outermost then the algorithm transitions to block 809. At this point the function context is added to the accumulated context. This operation is the collecting of the effects of restoring registers and accumulating adjustments to the stack pointer. They do not have to be carried out immediately, but effects have to be remembered and carried out before the jump to the handler. Also at this block, the function context is set equal to the outer function context as a function of the current function context. This is the location of the use of the invention. The "outer function context" is found using the code word in the context-call-instruction, whether the context is coded in the code word or in a pointer to a table with the context information. The "OuterFunctionContext( )" function is the same as the function of program counter f(PC) illustrated in FIG. 7. Thus, the arrow 720 of FIG. 7 represents the technique for finding the function context as a function of the program counter (for example by using the JSRC instruction) for the first call point encountered in the unwinding of the stack.

After block 809, the algorithm loops to block 803 to repeat the process. In this way, the process unwinds the stack following the path illustrated in FIG. 7 from arrow 720 to arrow 721 to arrow 722 to arrow 723 to arrow 724, arrow 725, arrow 726, arrow 727, arrow 728 until a try-block with a "catch" matching the type of the thrown object has been found.

If at block 808, the try block context was not the outermost of function context, then the try block context is set equal to outer try block (try block context), and the algorithm loops back to block 804 to traverse the new context information. This operation is simply traversing a list, whether it is a linked list or a table or other implementation, of the object list and handle list in the context information (block 810).

If at block 807 a handler was found, then the algorithm branches to block 811. At block 811, the objects specified in the handler description triple are copied. The ExceptioninProgress counter is decremented by 1, the stack pointer and other registers are restored using the accumulated context, and the program jumps to the handler. Next as indicated at block 812, when the handler exits the try block, the exception stack is popped and the destructor for the current object to throw is called. The storage for the object to throw is deallocated, and the algorithm returns to normal execution. If after block 811, the exception is rethrown, then the process loops back to the rethrow block at 813. The first step in the rethrow block is to determine whether the exception stack is empty at block 814. If it is, then the process terminates block 815. If the exception stack is not empty, then the exception object is set to the top of the exception stack (block 816), and the process loops to block 802.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A data processing system responsive to instructions in program code to execute a process and the instructions including call points between caller and called instructions and instructions for maintaining a stack, and the data processing system comprising:

instruction fetch logic which fetches the instructions in the program code to provide a sequence of instructions in response to an instruction pointer, the instructions further including first jump instructions with a jump address and second jump instructions with a jump address together with context information for a portion of the stack associated with the corresponding call point;

instruction decode logic, coupled to the instruction fetch logic, which decodes a current instruction in the sequence for execution, and including logic to detect the first and second jump instructions and to skip decoding the context information of the second jump instructions;

execution resources, coupled to the instruction decode logic, which execute the decoded instructions;

logic, coupled with the instruction fetch logic, which updates the instruction pointer; and an exception manager to handle exceptions generated by execution of the corresponding called function by accessing the context information of at least an associated one of the second jump instructions to unwind the stack.

2. The system of claim 1, wherein the second jump instructions include varying amounts of context information, and the logic which updates the instruction pointer updates the instruction pointer to another instruction in the sequence thereby avoiding the varying amounts of context information.

3. The system of claim 1, wherein the sequence of instructions comprises one or more exception handlers characterized by unwind information used to unwind one or more of the called and caller instructions including called instructions called via corresponding ones of the second jump commands, and wherein the context information of the second jump commands comprises at least a subset of the unwind information.

4. The system of claim 1, wherein the sequence of instructions comprises one or more context tables characterized by layout information regarding layout of corresponding portions of the stack, and wherein the context information in the second jump instructions comprises at least a subset of the layout information.

5. The system of claim 1, wherein the context information in the second jump instructions comprises a pointer to a memory location storing information regarding a context for the corresponding second jump instruction.

6. The system of claim 1, wherein the context information in the second jump instructions comprises immediate context data including: the offset to the return-address of the caller instruction; registers saved on the stack, and an amount of the stack allocated for local variables.

7. The system of claim 1, wherein the context information in the second jump instructions comprises a plurality of bytes of data, including a field for specifying a format of the plurality of bytes.

8. The system of claim 7, wherein the field indicates whether the plurality of bytes includes immediate context data, and whether the plurality of bytes includes a pointer to context information m another location.

9. The system of claim 1, further comprising:

a compiler-linker for generating the program code from source code and the compiler-linker for inserting the first jump instruction with an argument at the call-points of the caller to called instructions which do not throw exceptions and for inserting the second jump instruction with an argument together with corresponding context information at each of the call-points to called instructions which can throw exceptions.

10. A method for processing instructions in program code in a data processing system and the instructions including call points between caller and called instructions and instructions for maintaining a stack, and the method for processing comprising the acts of:

storing instructions in program code in addressable memory, the instructions including first jump instructions with a jump address and second jump instructions with a jump address together with context information for a portion of the stack associated with the corresponding call point;

fetching a sequence of instructions from the memory in response to an instruction pointer identifying an address in the addressable memory;

decoding a current instruction in the sequence, including detecting the first and second jump instructions and skipping decoding the context information of the second jump instructions;

updating the instruction pointer by a length of the current instruction;

calling an exception manager if conditions for the exception are met; and in response to calling the exception manager, reading the context information of at least an associated one of the second jump instructions at an address in the addressable memory determined in response to a function of the instruction pointer to unwind the stack.

11. The method of claim 10, wherein the second jump instructions include varying amounts of context information, and the function of the instruction pointer comprises an address based on the instruction pointer minus the corresponding varying amount of the length of the context information in the associated one of the second jump instructions.

12. The method of claim 10, wherein the context information in the second jump instructions comprises a pointer to a memory location storing context data associated with the corresponding second jump instruction.

13. The method of claim 10, wherein the context information in the second jump instructions comprises immediate context data including: the offset to the return-address of the caller instruction; registers saved on the stack; and an amount of the stack allocated for local variables.

14. The method of claim 10, wherein the context information in the second jump instructions comprises a plurality of bytes of data, including a field for specifying a format of the plurality of bytes.

15. The method of claim 14, wherein the field indicates whether the plurality of bytes includes immediate context data, and whether the plurality of bytes includes a pointer to context in another memory location.

16. The method of claim 10, wherein the sequence of instructions comprises one or more exception handlers characterized by unwind information used to unwind one or more of the called and caller instructions, and wherein the context information of the second jump commands comprises at least a subset of the unwind information.

17. The method of claim 10, wherein the sequence of instructions comprises one or more context tables characterized by layout information regarding layout of corresponding portions of the stack, and wherein the context information in the second jump instructions comprises at least a subset of the layout information.

18. The method of claim 10, further comprising the acts of:

providing source code with call points between caller and called instructions;

generating the program code from source code including;

inserting the first jump instruction with an argument at the call-points of the caller to called instructions which do not throw exceptions; and inserting the second jump instruction with both an argument together with corresponding context information at each of the call-points to called instructions which can throw exceptions.

19. A development system to generate program code from source code and to execute the program code, and the development system comprising:

a compiler-linker for generating the program code from source code and the compiler-linker for inserting a first jump instruction with an argument at the call-point of a calling function to a called function which does not throw exceptions and for inserting a second jump instruction with both an argument together with corresponding context information at each call-point to called functions which can throw exceptions and said compiler-linker further for generating instructions to maintain a stack;

logic for executing the program code including the arguments of the first and the second jump instructions and for avoiding the execution of the context information of the second jump instructions during normal processing; and an exception manager to handle the throwing of exceptions by the corresponding called function by accessing the context information of the associated second jump instruction to determine the layout of an associated portion of the stack thereby to unwind the associated portion of the stack.

* * * * *